US008959047B2

(12) United States Patent
Perlmutter et al.

(10) Patent No.: US 8,959,047 B2
(45) Date of Patent: Feb. 17, 2015

(54) REDUCING FALSE POSITIVES IN DATA VALIDATION USING STATISTICAL HEURISTICS

(75) Inventors: Amnon Perlmutter, Givatayim (IL); Limor Ganon, Ramat Hasharon (IL); Meir Jonathan Dahan, Tel Aviv (IL)

(73) Assignee: Check Point Software Technologies Ltd., Tel Aviv (IL)

( * ) Notice: Subject to any disclaimer, the term of this patent is extended or adjusted under 35 U.S.C. 154(b) by 259 days.

(21) Appl. No.: 13/468,045

(22) Filed: May 10, 2012

(65) Prior Publication Data

US 2013/0304690 A1    Nov. 14, 2013

(51) Int. Cl.
*G06N 5/00* (2006.01)
*G06F 1/00* (2006.01)

(52) U.S. Cl.
USPC ............................................................. 706/48

(58) Field of Classification Search
CPC .................................................. G06N 99/005

USPC ............................................................. 706/48
See application file for complete search history.

(56) References Cited

U.S. PATENT DOCUMENTS

2008/0147642 A1* 6/2008 Leffingwell et al. ............... 707/5
2009/0238474 A1* 9/2009 Sandberg ...................... 382/229

* cited by examiner

*Primary Examiner* — Jeffrey A Gaffin
*Assistant Examiner* — Kalpana Bharadwaj
(74) *Attorney, Agent, or Firm* — Mark M. Friedman

(57) ABSTRACT

To validate data, a plurality of strings that match a predetermined regular expression is extracted from the data. A validated subset of the strings is identified. To determine whether the validated subset has been falsely validated, it is determined whether the validated subset satisfies each of one or more predetermined criteria relative to the plurality of strings. In one embodiment, the subset is determined to be falsely validated if at least one of the criteria is satisfied. In another embodiment, the subset is determined to be falsely validated if all of the criteria are satisfied. The data are released only if the subset is determined to be falsely validated.

19 Claims, 3 Drawing Sheets

REDUCING FALSE POSITIVES IN DATA VALIDATION USING STATISTICAL HEURISTICS

FIELD AND BACKGROUND OF THE INVENTION

The present invention relates to data validation, for example in the context of data loss prevention, and, more particularly, to a method and device that use statistical heuristics to reduce the number of false positives.

Data is more accessible and transferable today than ever before, and the vast majority of data is sensitive at various levels. Some data is confidential simply because it is part of an internal organization and was not meant to be available to the public. Leakage of data could be embarrassing or, worse, cost the organization an industrial edge or loss of accounts.

Records of personally identifiable information, sale reports and customer information are examples of very sensitive information. Furthermore, many organizations are subject to regulatory compliance liabilities.

Data Loss Prevention (DLP) systems identify, monitor, and protect data transfer through deep content inspection and analysis of transaction parameters (such as source, destination, data, and protocol). In short, DLP detects and prevents the unauthorized release of confidential information.

DLP systems commonly use several analysis methods such as: file signatures, keywords search, pattern matching (regular expressions) and other sophisticated techniques to identify and recognize an organization's confidential data.

Pattern matching is used to search data that has a pre-defined structure, for example: credit card numbers, which are commonly 16-digit numbers. Credit card numbers also have a check digit, so not every 16-digit number is a valid credit card number. Running the credit card check digit validation function (Luhn-mod 10 checksum) determines if the 16-digit number might be a credit card number. Note that not all 16-digit numbers that pass the mod-10 validation function are valid credit card numbers. However, all valid credit card numbers pass the mod-10 validation function.

This credit card number example illustrates the fact that when using the pattern matching method, an additional validation may be used when applicable. Such validation method improves the accuracy of a DLP system in examining classified data.

Pattern matching only checks for certain structures of the digits, for example groups of four digits followed by a delimiter or digits that match a prefix in a list of prefixes corresponding to different credit card issuers. Data is "validatable" if, beyond the pattern matching method, a validation procedure exists that determines whether the data is correctly identified as sensitive (like the mod-10 calculation in the credit card example).

However, using patterns with a validation function may still generate false positives, thus increasing the administrative burden of managing a DLP system and decreasing the effectiveness of such a system. For instance, assuming that a DLP system searches for 20 national IDs that are 9 digit numbers with a mod-10 validation function, and that the examined text is a phonebook containing 9-digit phone numbers, it is very likely that some of the phone numbers that match the 9-digit pattern will also match the mod-10 calculation and thus will be considered by the DLP system to be valid national ID numbers.

It would be highly advantageous to have a DLP method and system that is more robust relative to false positives than known DLP methods and systems.

SUMMARY OF THE INVENTION

The method of the present invention is a text analyzing technique for detecting and ignoring false alarms associated with validatable patterns. The associated DLP system needs to reach a certain confidence level before determining that data is wrongly classified.

The present invention may be applied in all kinds of DLP contexts:
Data in motion (e.g. network actions)
Data at rest (e.g. stored data)
Data in use (e.g. endpoint actions)

There are several conventional methods for reducing false positives when using the pattern matching method in DLP systems, such as searching for related terms in proximity to the matched pattern (for example, searching for the string "National ID" in proximity to a 9-digit number). These methods can be used along with the method of the present invention.

Furthermore, the present invention may easily be applied to other text analysis applications, in contexts other than DLP, such as anti-spam or search/indexing applications.

Therefore, according to the present invention there is provided a method of validating data including the steps of: (a) extracting from the data a plurality of strings that match a predetermined regular expression; (b) identifying a validated subset of the strings; and (c) determining whether the validated subset satisfies each of at least one predetermined criterion relative to the plurality of strings.

Furthermore, according to the present invention there is provided a device for validating data comprising: (a) a regular expression extraction module for extracting from the data a plurality of strings that match a predetermined regular expression; (b) a validation module for identifying a validated subset of the strings; and (c) a censor module for determining whether the validated subset satisfies each of at least one predetermined criterion relative to the plurality of strings.

Furthermore, according to the present invention there is provided a device for validating data including: (a) a memory for storing program code for: (i) extracting from the data a plurality of strings that match a predetermined regular expression, (ii) to identifying a validated subset of the strings, and (iii) determining whether the validated subset satisfies each of at least one predetermined criterion relative to the plurality of strings; and (b) a processor for executing the program code.

Furthermore, according to the present invention there is provided a computer-readable storage medium having non-transient computer-readable code embodied on the computer-readable storage medium, the computer-readable code for validating data, the computer-readable code including: (a) program code for extracting from the data a plurality of strings that match a predetermined regular expression; (b) program code for identifying a validated subset of the strings; and (c) program code for determining whether the validated subset satisfies each of at least one predetermined criterion relative to the plurality of strings.

According to a basic method of the present invention for validating data, a plurality of strings that match a predetermined regular expression ("pattern") are extracted from the data. Then, a validated subset of the strings is identified. Note that the validated subset may very well be empty (if none of the extracted strings are "valid"). Then, it is determined whether the validated subset satisfies each of one or more predetermined criteria for non-release relative to the extracted strings.

Preferably, the criterion or criteria is/are for determining whether the subset has been falsely validated. In the primary intended application of the present invention, "validated" data are sensitive data that should not be released, and falsely validated data are safe to release.

Most preferably, the validated subset is determined to be falsely validated if the validated subset satisfies a predetermined number of the criteria (e.g., one of the criteria or all of the criteria). If the validated subset turns out to not be falsely validated, release of the data is blocked.

One preferred criterion for false validation is that the number of members of the validated subset, relative to the number of extracted strings, is below a predetermined threshold. Another preferred criterion for false validation, in the case of the extracted plurality of strings being an ordered plurality, is that every consecutive sequence of validated strings in the ordered plurality has less than a predetermined number of validated strings. Another preferred criterion for false validation, in the case of the extracted plurality of strings being an ordered plurality, is that a sufficiently small number of members of the validated subset appear within any window of a predetermined size among the extracted strings, relative to a predetermined threshold.

A first basic device of the present invention includes three functional modules: a regular expression extraction module, a validation module and a censor module. The regular expression extraction module extracts from the data a plurality of strings that match a predetermined regular expression. The validation module identifies a validated subset of the strings. The censor module determines whether the validated subset satisfies each of at least one predetermined cirterion relative to the plurality of strings. Preferably, the criterion or criteria is/are for determining whether the subset has been falsely validated. Most preferably, the censor module releases the data only if the valid subset is determined to be falsely validated.

A second basic device of the present invention includes a memory for storing program code for implementing the basic method of the present invention and a processor for executing the program code. Preferably, the device also includes an input port for receiving the data to be validated. Preferably, the criterion or criteria is/are for determining whether the subset has been falsely validated. More preferably, the program code also includes program code for releasing the data only if the valid subset is determined to be falsely validated. Most preferably, the device also includes an output port for releasing data that may be released.

The scope of the present invention also includes a computer-readable storage medium on which is embodied non-transient computer-readable code for implementing the basic method of the present invention. Preferably, the criterion or criteria is/are for determining whether the subset has been falsely validated. Most preferably, the computer-readable code also includes program code for releasing the data only if the valid subset is determined to be falsely validated.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figure 1:
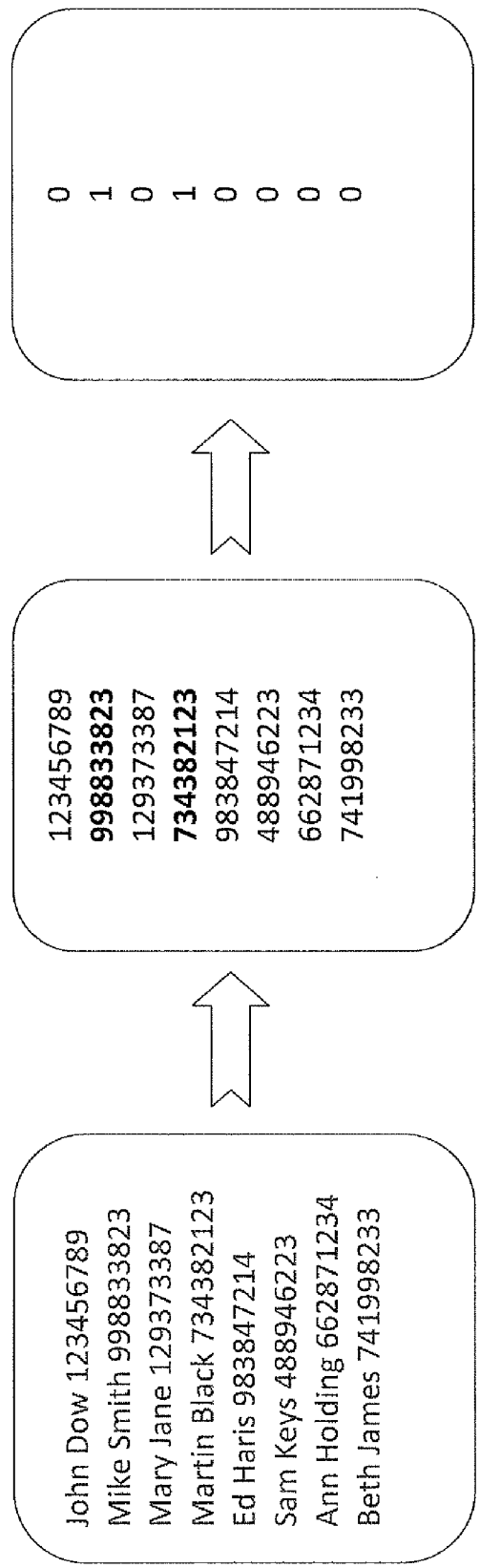
FIG. 1 illustrates validation of text according to the present invention.

The principles and operation of data validation according to the present invention may be better understood with reference to the drawings and the accompanying description.

The term "pattern", as used herein, refers to a regular expression. The following are examples of "patterns", where "D" is a decimal digit:

Date: DD/DD/DDDD
Phone number: DDDD-DDDDD
Credit card number: DDDD-DDDD-DDDD-DDDD The term "validation procedure", as used herein, refers to an algorithmic procedure that is applied to a string that matches a pattern and that determines whether the matched string should be classified as belonging to a specific data type.

Example: Luhn MOD-10 algorithm (Appendix D) for identifying valid credit card numbers The term "validatable pattern", as used herein, refers to a pattern that has a validation procedure.

Examples: regular expression of a valid credit card number, regular expression of a valid national ID number As noted above, relying solely on a validation procedure might still result in false positive incidents. Even though a single string that matches a pattern has a small probability of being validated, the probability of finding some valid strings increases dramatically when examining text with large numbers of strings that match a validatable pattern.

Consider again the phonebook example, in which the DLP system searches for 20 valid national ID numbers (9-digit numbers with mod-10 validation procedure). Any random 9-digit number has a probability of 10% of being validated by the mod-10 validation procedure (see Appendix D), so approximately one out of ten phone numbers will be validated as a national ID number. Therefore, a DLP system that examines a phone book with 1000 records might conclude that it contains about 100 national ID numbers, and consider the phone book to be a text with personally identifiable information.

Table 1 presents other examples of patterns that have validation procedures, and the probability of a matched string to be validated by its validation procedure.

TABLE 1

| Data type | Pattern | Validation Procedure | Probability of random string passing the validation procedure |
|---|---|---|---|
| Credit Card Number | DDDD-DDDD-DDDD-DDDD (16 digits) | Luhn - mod 10 | 0.1 |
| Australian Business Number (ABN) | DDDDDDDDDDD (11 digits) | Modulus 89 checksum | 0.001123 (1/89) |
| Netherlands Personal Number | DDDD.DD.DDD (9 digits) | Test-11 (also known as "Elfproef") | 0.0909 (1/11) |

The method of the present invention is a way to analyze the composition, the structure and the positioning of examined strings that match validatable patterns in order to determine the likelihood that the matches are false positives.

There are several statistical measures that can be applied for this analysis. Any measure that produces a probability estimation regarding the observation of matched string is applicable. Presented below are three such measures that can be used to minimize false positives.

As described, each statistical measure determines the probability of false positive.

According to the present invention, one or more of several statistical measures are applied, and in order to determine that the examined text is falsely detected, at least one of the applied measures need to determine so with high probability.

Three preferred statistical measures are described below:
1. Valid Expected Ratio measure: probability of valid/total ratio.
2. Valid Consecutive Sequence measure: probability of a consecutive sequence of valid strings.
3. Valid Neighborhood measure: probability of a valid string appearing in a fixed length sliding window.

For each statistical measure, the following procedure first is applied to the examined text:
1. Find all the strings that match a specific pattern (regular expression).
2. For each match, run the validation procedure.
3. Create a stream of bits, where '1' denotes a string that was validated in step 2 and '0' otherwise.

Referring now to the drawings, FIG. 1 illustrates a text (left) being converted into a stream of bits (right). In the first step, the entire text is stripped, leaving only strings that match the desired pattern (center). In the second step, each string is checked with a validation procedure. If a string passes the validation, it is consider a "valid string" and is highlighted in boldface (center) and set to '1' in the stream of bits (right), otherwise the string is considered a "non-valid string", set to '0'.

The a-priori probability of a random validatable string to be valid is represented herein as p. That is, p is the fraction of all valid strings out of all possible strings that match the regular expression.

In the example of national ID numbers: out of 1,000,000,000 different 9-digit numbers (ranging from 000,000,000 to 999,999,999) there are 100,000,000 valid ID numbers, therefore p=0.1.

Measure 1: Valid Expected Ratio

In this measure the a-priori probability of a random pattern to be validated by its validation procedure is used. A certain ratio of valid patterns in a text that contains random strings that match the pattern can be expected to be obtained. A high ratio suggests that the matched strings are data whose release the DLP is trying to prevent, and that the matched strings are not random numbers.

EXAMPLES

1. If out of 100 9-digit numbers, 75 of them are validated as National IDs, it is likely that these are real National IDs.
2. If out of 100 9-digit numbers, eight of them are validated as National IDs, it is likely that the eight strings are falsely detected as National IDs.

In order to determine the likelihood that the matched strings are falsely detected in a text the following steps are applied. See Appendix A for more details.
1. Determine the probability p of a random string to be matched by its validation procedure.
2. Count the number of matched strings in the text: n.
3. Count the number of matched strings in the text that are also validated by the validation procedure: x.
4. Calculate the ratio d between x/n and p. (d=x/np)
5. Calculate the probability q to encounter the ratio d assuming all patterns were generated randomly. When this probability is less than a threshold (for instance 0.05-5%) the set of matched patterns are probably correctly detected, otherwise they are considered to be falsely detected.

Note: Several different types of data may be searched in a text. Each data type is described by a different regular expression and a different validation procedure. Each type of data is handled separately.

This notion captures the general composition of patterns. In most cases this measure by itself suffices for detecting false positives with high certainty.

However, due to the first measure's definition its certainty is affected by the size of the entire document. For example, a reasonable set of valid ID numbers appearing in a document would be "masked" by very large phonebook following the set of ID numbers.

The next measure is focused on structural positioning of the examined strings.

Measure 2: Valid Consecutive Sequence

This measure uses the fact that if a set of random numbers that match a pattern is examined, some of the random numbers might be validated by the validation procedure. However, it is not likely that the random numbers that are validated would all be located together.

A "consecutive sequence of valid strings" as a sequence of strings that are validated by the validation procedure and appear one after the other in a text. Such a sequence would be presented as a sequence of '1' 's in the procedure illustrated in FIG. 1.

Such a sequence has a non-zero chance of occurring. Yet, the chance for encountering a long sequence of valid strings in text that is safe to release is very low. Moreover, the probability for a long sequence of valid strings to be observed in text that is safe to release decreases exponentially with respect to the length of the sequence. Hence, it doesn't requires a long sequence (5-6 is suffice) in order to determine that the examined text is probably not falsely detected.

In order to determine the likelihood that the matched strings are falsely detected in a text the following steps are applied. See Appendix B for more details.
1. Determine the probability p of a random string to be matched by its validation procedure.
2. Count the number of matched strings in the text: n.
3. Count the maximal consecutive sequence of matched strings in the stripped text (the text from which everything but the matched strings have been deleted: see FIG. 1) that are also validated by the validation procedure: k.
4. Calculate the expected maximal consecutive sequence $k_{exp}$, assuming the n patterns are generated randomly.
5. Calculate the ratio d between k and $k_{exp}$ ($d=k/k_{exp}$).
6. Calculate the probability q to encounter the ratio d assuming all strings were generated randomly. When this probability is less than a threshold (for instance 0.05-5%) the set of matched strings are probably correctly detected, otherwise the matched strings are considered to be falsely detected.

Note: Several different types of data may be searched in a text. Each data type is described by a different regular expression and different validation procedure. Each type of data is handled separately.

Measure 3: Valid Neighborhood

Similarly to the previous measure, this measure inspects the manner in which valid matched strings are distributed in a small window. In some cases validated matched strings may not necessarily appear consecutivly. However, it is unlikely for multiple validated matched strings to appear close to each other.

In order to determine the likelihood that the matched strings are falsely detected in a text the following steps are applied. See Appendix C for more details.

1. Determine the probability p of a random string to be matched by its validation procedure.
2. Count the number of matched strings in the text: n.
3. Group matched strings into windows of size w. Meaning that the first window spans matched strings numbers 1 through w, the second window spans matched strings numbers 2 through w+1 etc.
4. Count the number of validated matched strings in every window. Maintain the largest value found: k.
5. Calculate the expected maximal number of validated matched strings in a window of size w, assuming the n patterns are generated randomly: $k_{exp}$
6. Calculate the ratio d between k and $k_{exp}$ (d=k/$k_{exp}$).
7. Calculate the probability q to encounter the ratio d assuming all strings were generated randomly. When this probability is less than a threshold (for instance 0.05-5%) the set of matched strings are probably correctly detected, otherwise the matched strings are considered to be falsely detected.

Note: Several different types of data may be searched in a text. Each data type is described by a different regular expression and different validation procedure. Each type of data is handled separately.

A device for validating data according to the present invention may be implemented in hardware, firmware, software or any combination thereof.

Figure 2:
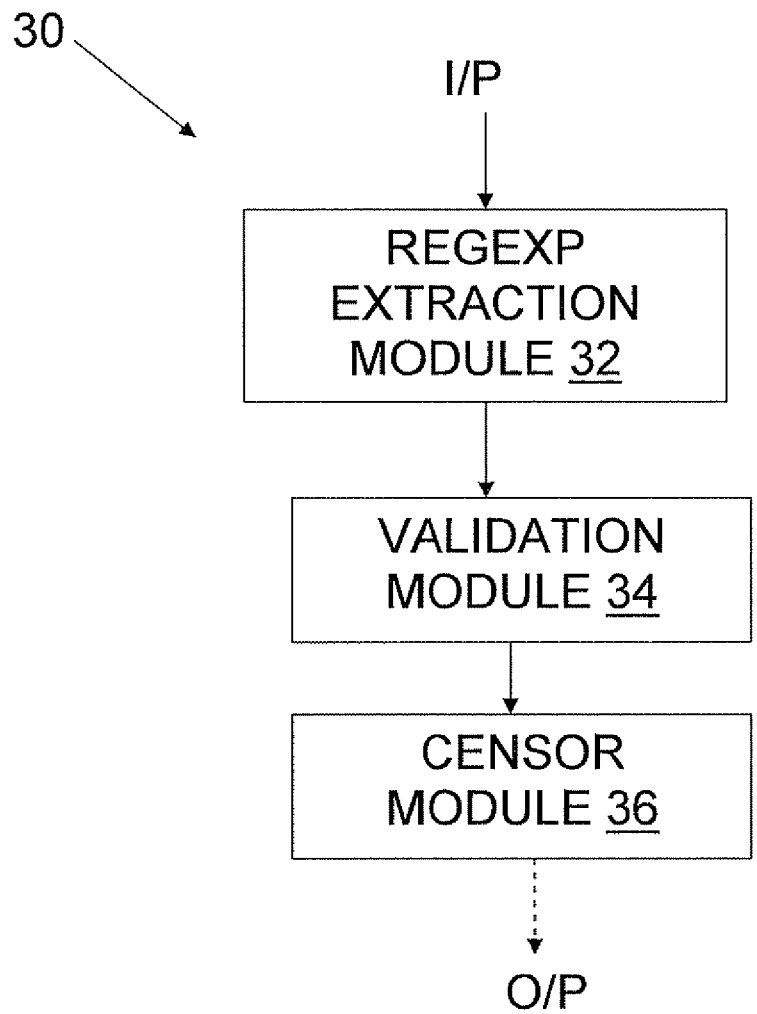
FIG. 2 is a high-level functional block diagram of a device of the present invention.

FIG. 2 is a high-level functional block diagram of a device 30 for validating data according to the present invention. Device 30 includes three functional modules: a regular expression extraction module 32 that extracts from the data all the strings that match a predetermined regular expression, a validation module 34 that identifies a validated subset of the strings, and a censor module 36 that determines whether the validated subset satisfies one or more criteria for non-release of the data and releases the data only if the criterion or criteria is/are not satisfied. The arrows in FIG. 2 show the flow of data from input ("I/P") at the top of the Figure to output ("O/P") at the bottom of the Figure. The arrow from module 36 to "O/P" is dashed to indicate that the output is conditional on the output of module 34 being determined by module 36 to have been falsely validated.

Each of modules 32, 34 and 36 may be implemented in hardware, firmware, software or any combination thereof.

Figure 3:
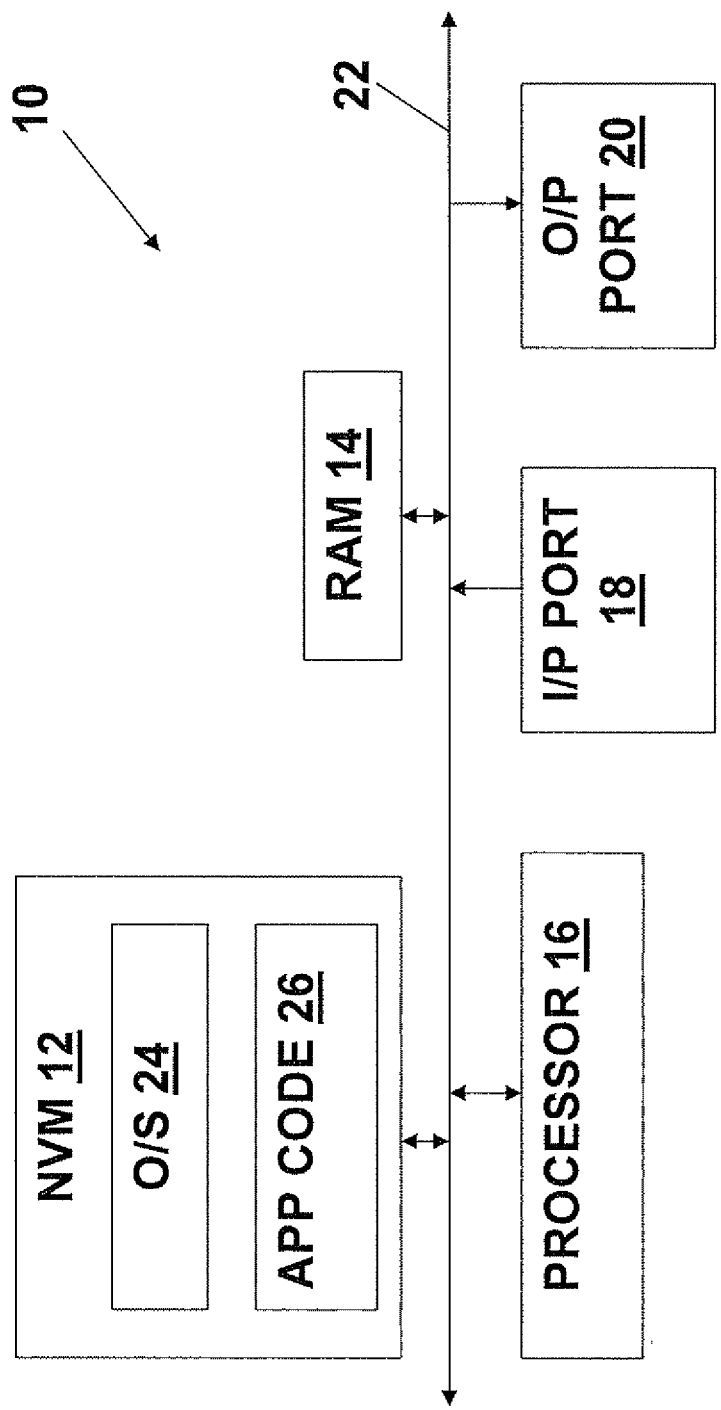
FIG. 3 is a high-level partial block diagram of a software-based device of the present invention.

FIG. 3 is a high-level partial block diagram of a software-based device 10 is for validating data according to the present invention. For clarity of illustration, only the components of device 10 that are directly relevant to the present invention are illustrated in FIG. 3. Device 10 includes a non-volatile memory (NVM) 12, a random access memory (RAM) 14, a processor 16, an input port 18 and an output port 20, all communicating with each other via a bus 22. An operating system (O/S) 24 of the device is stored in non-volatile memory 12, as is application code 26 for implementing the method of the present invention as described above. Under the control of O/S 24, processor 16 loads application code 26 into RAM 14 and executes application code 26 from RAM 14. Device 10 receives data to validate via input port 18 and, using processor 16, stores the data in RAM 14 and executes application code 26 to validate the data. Data that fails the validation criterion or criteria is released via output port 20.

Non-volatile memory 12 is an example of a computer-readable storage medium bearing computer-readable code for implementing the data validation methodology described herein. Other examples of such computer-readable storage media include read-only memories such as CDs bearing such code.

While the invention has been described with respect to a limited number of embodiments, it will be appreciated that many variations, modifications and other applications of the invention may be made. Therefore, the claimed invention as recited in the claims that follow is not limited to the embodiments described herein.

Appendix A: Valid Expected Ratio

Let n be the number of matches of a pattern in a document. Let p be the probability of a random matching string to be validated by its validation procedure. Let X be the number of validstrings observed in the document. Let µ be the expected number of validated strings, out of a total of n strings. Assuming a uniform distribution of strings, X has a binomial distribution with parameters n,p. Therefore, the probability of seeing exactly i valid strings out of n strings in a document is given by:

$$\binom{n}{i} p^i (1-p)^{n-i}$$

Hence, the probability of seeing k or more valid strings is:

$$\sum_{i=k}^{n} \binom{n}{i} p^i (1-p)^{n-i}$$

so that the probability that the number of valid strings will deviate from µ by more than factor of δ is bounded by:

$$Pr[X > \mu(1+\delta)] \le \sum_{i=\lfloor \mu(1+\delta) \rfloor}^{n} \binom{n}{i} p^i (1-p)^{n-i} = 1 - CDF(n, p, \mu(1+\delta))$$

where CDF is the Cumulative Density Function of the bionomical distribution. This bound is indeed tight and exact, however a direct computation may be computationally and numerically expensive to compute. Preprocessing and computing this function for selected n,δ,p values will speed up the process at the cost of memory and accuracy. After scanning a document we look up the closest values of n,δ,p sampled beforehand and estimate CDF accordingly.

Table 2 demonstrates the usefulness of this approach. Each row corresponds to a different value of n. Each column corresponds to different deviation value −δ. Each cell is a direct computation of the equation above where p is constant and set to 0.1.

Each cell indicates the probability for deviating by δ from the expected value by chance. For example, in a document that has 100 pattern matches, of which 15 are valid, if a random string would be valid only 10% of the time (µ=10, δ=15/µ−1=0.5), then the probability for there to be 15 valid strings purely by chance is less than 4% (0.0399).

As shown, it doesn't require a large deviation to assure that an observed series of strings that match a pattern occurred by chance.

Notice that values decrease rapidly across the rows, and also down the columns for δ≥1. This attribute is an important feature that guarantees a high certainty value with a small number of matched validated strings.

TABLE 2

| N | δ 0.05 | 0.3 | 0.5 | 1.0 | 2.0 |
|---|---|---|---|---|---|
| 10 | 0.2639 | 0.2639 | 0.2639 | 0.0702 | 0.0128 |
| 20 | 0.3231 | 0.3231 | 0.1330 | 0.0432 | 0.0024 |
| 30 | 0.3526 | 0.3526 | 0.1755 | 0.0258 | 0.0005 |
| 40 | 0.3710 | 0.2063 | 0.0995 | 0.0155 | 0.0001 |
| 50 | 0.3839 | 0.2298 | 0.1221 | 0.0094 | 0.0000 |
| 60 | 0.3935 | 0.2484 | 0.0731 | 0.0057 | 0.0000 |
| 70 | 0.4011 | 0.1586 | 0.0873 | 0.0035 | 0.0000 |
| 80 | 0.4073 | 0.1734 | 0.0538 | 0.0021 | 0.0000 |
| 90 | 0.4125 | 0.1865 | 0.0634 | 0.0013 | 0.0000 |
| 100 | 0.4168 | 0.1239 | 0.0399 | 0.0008 | 0.0000 |
| 110 | 0.4206 | 0.1343 | 0.0465 | 0.0005 | 0.0000 |

Appendix B: Valid Consecutive Sequence

The probability of encountering k valid consecutive strings at a certain position is given by:

$$\Pr[k \text{ consecutive}] = p^k$$

Thus, encountering k consecutive valid patterns in an entire document of n strings is bounded by:

$$Pr[k \text{ consecutive valid strings out of } n] \le (n-k-1) p^k \le np^k$$

So to insure an error rate level, err, we require k to satisfy the following:

$$Pr[k \text{ consecutive valid strings out of } n] \le np^k \le err$$

$$k \log p \le \log\left(\frac{err}{n}\right)$$

$$k \ge \left\lceil \frac{\log\left(\frac{err}{n}\right)}{\log p} \right\rceil$$

For example, for a certainty rate of 97% (an error rate of 3%), in a document containing n=100 patterns, let p=0.1 be the probability that a random string is valid. Then, $k > \log_{0.1}[0.03/100] \sim 3.5$. Hence, to ensure at least this certainty rate we must observe four consecutive valid strings, given that 100 strings were detected.

Appendix C: Valid Neighborhood

This measure bounds the probability of the number of validated matched strings appearing in any small window. For example, it is unlikely to encounter eight valid matches in a neighborhood of fifteen matched strings (not necessary consecutive valid patterns).

The probability that there are at least k matches in any window size of w, assuming all patterns are generated randomly is bounded by:

Pr[k validated matched strings in window w, out of n matched strings]≤

$$n \sum_{i=k}^{n} \binom{w}{i} p^i (1-p)^{w-i} = n(1 - CDF(w, p, k))$$

Appendix D: Luhn—Mod 10 Algorithm

The Luhn algorithm, also known as the "mod 10" algorithm, is a checksum formula used to validate a variety of identification numbers.

In order to determine if a number is valid according to the mod 10 algorithm, run the following steps:
1. Count from the rightmost digit and moving left, double the value of every second digit.
2. Sum the digits of the products (e.g., 10=1+0=1) together with the un-doubled digits from the original number.
3. If the total modulo 10 is equal to 0 then the number is valid according to the Luhn formula; else it is not valid.

What is claimed is:

1. A method of validating data comprising the steps of:
    (a) extracting from the data a plurality of strings that match a predetermined regular expression;
    (b) identifying a validated subset of said strings;
    (c) calculating a known probability for a statistical measure of the data based on said predetermined regular expression;
    (d) comparing said statistical measure of said validated subset to said known probability for said statistical measure; and
    (e) determining, based on said comparing, if said validated subset meets at least one predetermined criterion relative to all of said plurality of strings taken collectively.

2. The method of claim 1, wherein said at least one predetermined criterion is for determining whether said subset is falsely validated.

3. The method of claim 2, wherein said subset is determined to be falsely validated if said validated subset satisfies one of said at least one predetermined criterion.

4. The method of claim 2, wherein said subset is determined to be falsely validated if said validated subset satisfies all of said at least one predetermined criterion.

5. The method of claim 2, further comprising the step of:
    (a) blocking a release of the data if said validated subset is determined to not be falsely validated.

6. The method of claim 2, wherein one of said at least one predetermined criterion is that a number of members of said validated subset, relative to a number of said strings in said plurality, is below a predetermined threshold.

7. The method of claim 2, wherein said plurality of strings is an ordered plurality, and wherein one of said at least one predetermined criterion is that every consecutive sequence of members of said validated subset in said ordered plurality of strings includes less than a predetermined number of said members of said validated subset.

8. The method of claim 2, wherein said plurality of strings is an ordered plurality, and wherein one of said at least one predetermined criterion is that, for any window of a predetermined size in said ordered plurality of strings, a number of members of said validated subset that appear within said window is below a predetermined threshold.

9. A device for validating data comprising:
    (a) a regular expression extraction module for extracting from the data a plurality of strings that match a predetermined regular expression;
    (b) a validation module for identifying a validated subset of said strings; and
    (c) a censor module for:
        (i) calculating a known probability for a statistical measure of the data based on said predetermined regular expression;

(ii) comparing said statistical measure of said validated subset to said known probability for said statistical measure; and
(iii) determining, based on said comparing, if said validated subset meets at least one predetermined criterion relative to all of said plurality of strings taken collectively.

10. The device of claim 9, wherein said at least one predetermined criterion is for determining whether said subset is falsely validated.

11. The device of claim 10, wherein said censor module releases the data only if said valid subset is determined to be falsely validated.

12. A device for validating data comprising:
(a) a memory for storing program code for:
(i) extracting from the data a plurality of strings that match a predetermined regular expression,
(ii) identifying a validated subset of said strings,
(iii) calculating a known probability for a statistical measure of the data based on said predetermined regular expression;
(iv) comparing said statistical measure of said validated subset to said known probability for said statistical measure; and
(v) determining, based on said comparing, if said validated subset meets at least one predetermined criterion relative to all of said plurality of strings taken collectively; and
(b) a processor for executing said program code.

13. The device of claim 12, further comprising:
(a) an input port for receiving the data.

14. The device of claim 12, wherein said at least one predetermined criterion is for determining whether said subset is falsely validated.

15. The device of claim 14, wherein said program code also includes program code for releasing the data only if said valid subset is determined to be falsely validated.

16. The device of claim 15, further comprising:
(a) an output port for releasing the data.

17. A non-transitory, tangible, computer-readable storage medium having non-transient computer-readable code embodied on the computer-readable storage medium, the computer-readable code for validating data, the computer-readable code comprising:
(a) program code for:
(i) extracting from the data a plurality of strings that match a predetermined regular expression;
(ii) identifying a validated subset of said strings;
(iii) calculating a known probability for a statistical measure of the data based on said predetermined regular expression;
(iv) comparing said statistical measure of said validated subset to said known probability for said statistical measure; and
(v) determining, based on said comparing, if said validated subset meets at least one predetermined criterion relative to all of said plurality of strings taken collectively.

18. The computer-readable storage medium of claim 17, wherein said at least one predetermined criterion is for determining whether said subset is falsely validated.

19. The computer-readable storage medium of claim 18, wherein the computer-readable code further comprises:
(d) program code for releasing the data only if said valid subset is determined to be falsely validated.

* * * * *